(12) United States Patent
Staring (10) Patent No.: US 11,532,953 B2
(45) Date of Patent: Dec. 20, 2022

(54) WIRELESS POWER TRANSFER (71) Applicant: KONINKLIJKE PHILIPS N.V., Eindhoven (NL)

(72) Inventor: Antonius Adriaan Maria Staring, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 17/283,274

(22) PCT Filed: Oct. 7, 2019

(86) PCT No.: PCT/EP2019/077062
§ 371 (c)(1),
(2) Date: Apr. 7, 2021

(87) PCT Pub. No.: WO2020/074433
PCT Pub. Date: Apr. 16, 2020

(65) Prior Publication Data
US 2021/0384769 A1 Dec. 9, 2021

(30) Foreign Application Priority Data
Oct. 9, 2018 (EP) .................................... 18199229

(51) Int. Cl.
*H02J 50/60* (2016.01)
*H02J 50/12* (2016.01)
*H02J 50/80* (2016.01)

(52) U.S. Cl.
CPC .............. *H02J 50/12* (2016.02); *H02J 50/60* (2016.02); *H02J 50/80* (2016.02)

(58) Field of Classification Search
CPC ............. H02J 50/12; H02J 50/60; H02J 50/80
See application file for complete search history.

(56) References Cited

U.S. PATENT DOCUMENTS

2009/0127936 A1* 5/2009 Kamijo ................... H02J 50/90
307/104
2010/0084918 A1 4/2010 Fells et al.
(Continued)

FOREIGN PATENT DOCUMENTS

EP         3410568 A1 * 12/2018 .............. H02J 50/12
WO   WO-2017121672 A1 *  7/2017 ............. H01F 27/28
(Continued)

OTHER PUBLICATIONS

QI Specification version 1.2.3 Feb. 2017.
International Search Report and Written Opinion from PCT/EP2019/077062 dated Dec. 17, 2019.

*Primary Examiner* — Pinping Sun (57) ABSTRACT

A wireless power transfer system comprises a power transmitter (101) wirelessly providing power to a power receiver (105) via an electromagnetic power transfer signal. The power transmitter (101) comprises a transmitter coil (103) generating the power transfer signal and a driver (201) generating a drive signal for the transmitter coil (103) to generate the power transfer signal. A foreign object detector (207) executes a foreign object detection operation arranged to detect a presence of a foreign object in response to a property of the drive signal. A communicator (205) receives a power operating point indication from the power receiver (105) which represents a load power for a load of the power receiver (105). An adapter (209) adapts the foreign object detection operation in response to the operating point indication being indicative of a change in the load power meeting a criterion.

20 Claims, 3 Drawing Sheets

(56) References Cited

U.S. PATENT DOCUMENTS

| | | | |
|---|---|---|---|
| 2011/0196544 A1 | 8/2011 | Baarman et al. | |
| 2011/0285210 A1 | 11/2011 | Lemmens et al. | |
| 2013/0062959 A1* | 3/2013 | Lee | H04B 5/0043 |
| | | | 307/104 |
| 2013/0162220 A1* | 6/2013 | Iijima | H02J 50/10 |
| | | | 320/137 |
| 2014/0324239 A1* | 10/2014 | Zettel | G05B 13/026 |
| | | | 700/291 |
| 2015/0207333 A1* | 7/2015 | Baarman | H02J 7/025 |
| | | | 307/104 |
| 2015/0263532 A1* | 9/2015 | Van Wageningen | H02J 50/60 |
| | | | 307/104 |
| 2016/0006289 A1* | 1/2016 | Sever | H02J 7/00034 |
| | | | 320/108 |
| 2016/0149440 A1* | 5/2016 | Staring | H02J 50/40 |
| | | | 307/104 |
| 2016/0218567 A1* | 7/2016 | Nakano | H04B 5/005 |
| 2017/0018977 A1* | 1/2017 | Van Wageningen | H02J 50/60 |
| 2018/0342907 A1* | 11/2018 | Dimke | B60L 53/122 |
| 2018/0366994 A1* | 12/2018 | Meichle | B60L 53/124 |
| 2019/0190320 A1* | 6/2019 | Park | H02J 50/12 |
| 2020/0280220 A1* | 9/2020 | Ettes | H02J 50/10 |
| 2021/0036555 A1* | 2/2021 | Park | H04L 29/06 |

FOREIGN PATENT DOCUMENTS

| | | | | |
|---|---|---|---|---|
| WO | WO-2019037926 A1 * | 2/2019 | | H02J 50/90 |
| WO | WO-2019146932 A1 * | 8/2019 | | H02H 3/18 |

* cited by examiner

WIRELESS POWER TRANSFER

CROSS-REFERENCE TO PRIOR APPLICATIONS

This application is the U.S. National Phase application under 35 U.S.C. § 371 of International Application No. PCT/EP2019/077062, filed on Oct. 7, 2019, which claims the benefit of EP Patent Application No. EP 18199229.8, filed on Oct. 9, 2018. These applications are hereby incorporated by reference herein.

FIELD OF THE INVENTION

The invention relates to inductive wireless power transfer and in particular, but not exclusively, to foreign object detection in a wireless power transfer system compatible with the Qi Specifications for wireless power transfer systems.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

In power transfer systems, such as Qi, the electromagnetic field generated in order to transfer the required levels of power to the power receiver is often very substantial. The presence of such a strong field may in many situations have an impact on the surroundings.

For example, a potential problem with wireless power transfer is that power may unintentionally be transferred to e.g. metallic objects that happen to be in the vicinity of the power transmitter. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may be highly undesirable.

In order to reduce the risk of such scenarios arising, it has been proposed to introduce foreign object detection where the power transmitter can detect the presence of a foreign object and reduce the transmit power and/or generate a user alert when a positive detection occurs. For example, the Qi system includes functionality for detecting a foreign object, and for reducing power if a foreign object is detected.

The Qi specification describes various methods for detecting a foreign object:

Q-Factor Reporting:

According to this feature, a power receiver is required to report the quality factor of a reference coil, having the power receiver product placed thereon. The power transmitter can derive a threshold from this reported value—applying any necessary adjustments to account for differences between its coil and the reference coil—and conclude that a foreign object is (or might be) present if a measured Q-factor value is below the threshold. Section 11.3 in Parts 1&2 of the Qi Specification (v1.2.x) provides more details about the Q-factor reporting feature.

Power Loss Accounting

According to this feature a power receiver is required to regularly report the amount of power it receives. The reported value consists of the amount of power the power receiver provides to its load plus the losses incurred in the power receiver. The power receiver typically has to estimate the latter, because such values are difficult to measure in practice. The power transmitter typically determines the amount of power it transmits by measuring the amount of power it consumes from its power source and subtracting an estimate of its losses. The difference between the transmitted power and received power values is indicative for the amount of power absorbed in a foreign object. Experiments have shown that a difference of 300 mW or more (assuming perfect power loss estimates) indicates that a foreign object runs the risk of being heated to undesirably high temperatures. Given the low threshold value, it is imperative that the estimates of the received and transmitted powers are as accurate as possible.

In practice, it tends to be difficult to achieve sufficient detection accuracy and in order to improve the detection reliability, calibration of the foreign object detection is employed to allow compensation of the foreign object detection algorithm to compensate e.g. for losses in the power transmitter or the specific power receiver.

The Qi Specification includes a power calibration feature which enables the power transmitter to improve its foreign object detection operation, and specifically the power loss estimate. In this approach, the power receiver must first operate in a low power ('light load') state and subsequently in a high power ('connected load') state. The power transmitter uses the reported values during calibration processes at respectively light load and connected load to establish a relation between the estimated losses and the amount of transmitted power. When establishing this relation, it is assumed that there is no foreign object present in the magnetic field, and thus it is assumed that the amount of transmitted power can be considered to be identical to the amount of received power. It is further assumed that the power receiver is stationary on the power transmitter's interface surface.

The Qi Specification requires the calibration to be finished within the first ten seconds of power transfer. The reason for this limit is that a foreign object might accidentally enter the magnetic field at any time, without being detected before the calibration is complete. This will render the calibration useless and indeed even potentially problematic as it may prevent subsequent detection of foreign objects. The time limit was selected as a reasonable trade-off between the risk of a foreign object entering the magnetic field and the time required to perform a sufficiently reliable calibration.

Section 11.4 in Parts 1&2 of the Qi Specification (v1.2.x) provides more details about the power loss accounting feature and the calibration method. However, the Inventor has realized that the current foreign object detection approach is not optimal in all situations.

Hence, an improved operation for a power transfer system would be advantageous, in particular, an approach allowing increased flexibility, reduced cost, reduced complexity, improved foreign object detection, improved support for different loads, improved adaptability, backwards compatibility, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an electromagnetic power transfer signal during a power transfer phase; the power transmitter comprising: a transmitter coil for generating the power transfer signal; a driver for generating a drive signal for the transmitter coil to generate the power transfer signal; a foreign object detector for executing a foreign object detection operation arranged to detect a presence of a foreign object in response to a property of the drive signal; a communicator for receiving a power operating point indication from the power receiver during the power transfer phase, the power operating point indication representing a load power for a load of the power receiver; and an adapter for adapting the foreign object detection operation during the power transfer phase in response to the operating point indication being indicative of a change in the load power meeting a criterion.

The invention may provide improved operation and/or performance in many embodiments and may specifically provide improved foreign object detection in many scenarios. The approach may for example be applied to Qi compatible systems and may allow improved performance for scenarios in which a power receiver does not immediately extract the maximum power when entering the power transfer phase. The approach may provide improved foreign object detection in systems and scenarios where the loading of the power receiver may e.g. switch between different load modes. The approach may be implemented with low complexity and may typically be relatively easy to introduce to existing systems, such as Qi.

The load power for the load of the power receiver may be a target load power for the load of the power receiver.

The power operating point indication may be transmitted during the power transfer phase. The power operating point indication may be an indication of a change in the load power, and specifically may indicate a change in the load power above a threshold. The change may be a change in the power transfer phase.

The power operating point indication may be indicative of a change in a load mode for the power receiver and/or the load of the power receiver.

The power operating point indication may be indicative of a (target) load change meeting a criterion. The power operating point indication may be indicative of a (target) load change exceeding a threshold. The power operating point indication is indicative of a change in the desired power from the power receiver meeting a criterion/exceeding a threshold.

The power operating point indication may only be dependent on the power provided to the load of the power receiver and may be independent of any other parameter of the power path. The power operating point indication may be independent on any power consumption of the power receiver except for the power of the load. The power operating point indication may be independent of any power consumption of any control functionality for supporting the power transfer.

In accordance with an optional feature of the invention, the power operating point indication is indicative of a future change in the load power.

This may provide improved performance in many embodiments. It may in many scenarios provide reduced probability of false detections during changes in power operating point.

The property of the drive signal used for the foreign object detection may e.g. be a frequency property, phase property, voltage property, current property, power property, waveform property, timing property, and/or signal shape property.

In accordance with an optional feature of the invention, the adapter is arranged to initiate a calibration process in response to the operating point indication indicating the change in the target load power meeting the criterion, the calibration process being arranged to determine a calibration parameter for the foreign object detection operation in response to a measurement of a property of the drive signal.

This may allow improved foreign object detection for different power levels. It may allow improved calibration data, and specifically may provide improved compensation over a range of power levels.

The calibration parameter may be a compensation parameter for a determination or calculation of a parameter used in the detection of whether a foreign object is present or not. It may include compensation for/of a power loss, a power difference, a quality factor, a detection threshold etc.

In accordance with an optional feature of the invention, the calibration parameter is a parameter of a detection criterion for detecting the foreign object. This may provide improved foreign object detection in many scenarios.

In accordance with an optional feature of the invention, the adapter is arranged to bias the foreign object detection operation towards no detection of a foreign object for a time interval in response to the operating point indication indicating the change in the target load power meeting the criterion.

This may provide improved performance in many embodiments and may specifically reduce the risk of false foreign object detections in connection with transient situations where the load of the power receiver changes (e.g. a step change). However, it may in many embodiments still allow some detection functionality e.g. of more extreme cases of power dissipation in foreign objects.

In accordance with an optional feature of the invention, the adapter is arranged to adapt the foreign object detection operation to not detect a foreign object for a time interval in response to the operating point indication indicating the change in the target load power meeting the criterion.

This may provide improved performance in many embodiments and may specifically reduce the risk of false foreign object detections in connection with transient situations where the load of the power receiver changes (e.g. a step change).

In accordance with an optional feature of the invention, the power operating point indication is independent of a current power extraction by the power receiver.

This may provide advantageous operation and specifically foreign object detection in many embodiments.

In accordance with an optional feature of the invention, the power operating point indication is included in a received power level message for indicating a power extracted from the power transfer signal by the power receiver.

This may provide particularly advantageous operation in many embodiments. It may in particular allow efficient operation and communication.

In accordance with an optional feature of the invention, the power operating point indication is a binary indication of whether a change in the target power level meets a criterion.

This may provide particularly advantageous operation in many embodiments. It may in particular allow efficient operation and communication.

According to an aspect of the invention there is provided a power receiver for wirelessly receiving power from a power transmitter via an electromagnetic power transfer signal during a power transfer phase; the power receiver comprising: a receiver coil for extracting power from the power transfer signal; a power circuit for providing power to a load from the power extracted from the power transfer signal; a processor for determining a power operating point reflecting a load power for the load during the power transfer phase; an indication processor for generating a power operating point indication indicative of the power operating point; a communicator for transmitting the power operating point indication to the power transmitter during the power transfer phase.

In accordance with an optional feature of the invention, the indication processor is arranged to generate the power operating point indication to be indicative of a change in the load power exceeding a threshold.

In accordance with an optional feature of the invention, the power receiver further comprises a load determiner arranged to measure a level of power provided to the load, and the indication processor is arranged to determine the power operating point in response to the level of power.

According to an aspect of the invention there is provided a wireless power transfer system comprising a power receiver and a power transmitter as descried above.

According to an aspect of the invention there is provided a method of operation for a power transmitter wirelessly providing power to a power receiver via an electromagnetic power transfer signal during a power transfer phase; the method comprising: a transmitter coil generating the power transfer signal; generating a drive signal for the transmitter coil to generate the power transfer signal; executing a foreign object detection operation arranged to detect a presence of a foreign object in response to a property of the drive signal; receiving a power operating point indication from the power receiver during the power transfer phase, the power operating point indication representing a load power for a load of the power receiver; and adapting the foreign object detection operation during the power transfer phase in response to the operating point indication indicating a change in the load power meeting a criterion.

According to an aspect of the invention there is provided a method of operation for a power receiver wirelessly receiving power from a power transmitter via an electromagnetic power transfer signal during a power transfer phase; the method comprising: a receiver coil extracting power from the power transfer signal; providing power to a load from the power extracted from the power transfer signal; determining a power operating point reflecting a load power for the load during the power transfer phase; generating a power operating point indication indicative of the power operating point; and transmitting the power operating point indication to the power transmitter during the power transfer phase.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
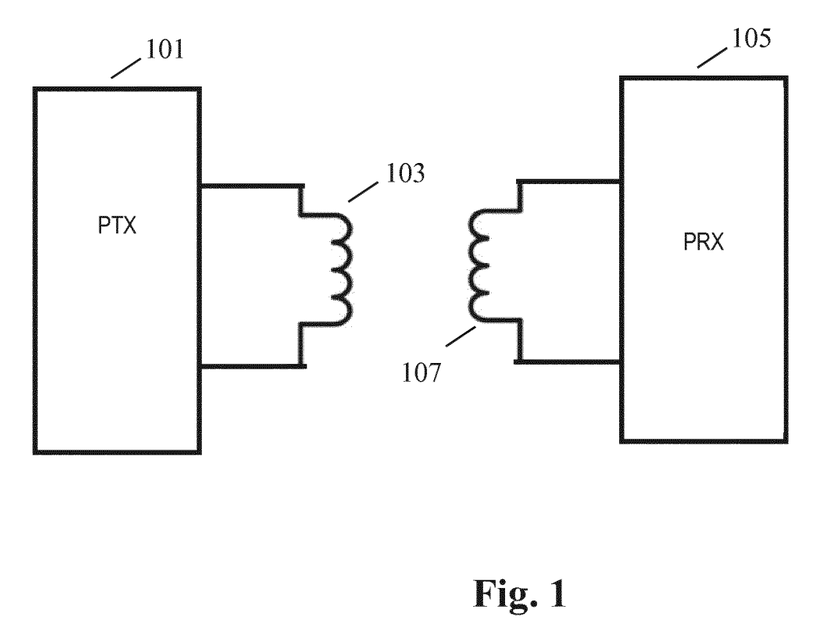
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the receiver coil 107 are loosely coupled and thus the receiver coil 107 picks up (at least part of) the power transfer signal from the power transmitter 101. Thus, the power is transferred from the power transmitter 101 to the power receiver 105 via a wireless inductive coupling from the transmitter coil 103 to the receiver coil 107. The term power transfer signal is mainly used to refer to the inductive signal/magnetic field between the transmitter coil 103 and the receiver coil 107 (the magnetic flux signal), but it will be appreciated that by equivalence it may also be considered and used as a reference to an electrical signal provided to the transmitter coil 103 or picked up by the receiver coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In wireless power transfer systems, the presence of an object (typically a conductive element extracting power from the power transfer signal and not being part of the power transmitter 101 or the power receiver 105, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object.

In order to address such scenarios, wireless power transfer systems such as Qi include functionality for foreign object detection. Specifically, the power transmitter comprises functionality seeking to detect whether a foreign object is present or not. If so, the power transmitter may e.g. terminate the power transfer or reduce the maximum amount of power that can be transferred.

Current approaches proposed by the Qi Specifications are based on detecting a power loss (by comparing the transmitted and the reported received power) or detecting degradations in the quality Q of an output resonance circuit of the power transmitter. However, in current use these approaches have been found to provide suboptimal performance in some scenarios, and they may specifically lead to inaccurate detection resulting in missed detections and/or false positives where a foreign object is detected despite no such object being present.

Foreign object detection may be performed before a power receiver enters the power transfer phase (e.g. during the initialization of the power transfer) or during the power transfer phase. Detection during the power transfer phase is often based on comparisons of measured transmitted power and received power whereas detection that take place before the power transfer phase is often based on measurements of a reflected impedance, e.g. by measuring the quality factor of the transmitter coil by using a small measurement signal.

In order to improve foreign object detection, Qi specifies that calibration processes are to be performed during the initialization process for a power transfer and within 10 seconds of the power transfer beginning (within 10 seconds of the system entering the power transfer phase). The first calibration process is thus performed before the power receiver provides power to the end load and the second calibration process is performed after the load has been connected (i.e. it is provided with power). The calibration processes are performed to specifically determine the impact of friendly metal in the power receiver such that e.g. a power loss calculation/detection can be compensated for this power loss.

For example, during the calibration process, the power extracted by the power receiver is reported back to the power transmitter which proceeds to subtract it from the transmitted power (the power fed to the transmitter coil 103). The difference represents a loss in other elements than the receiver coil 107. As it is assumed that there is no foreign object present during calibration, this power loss may thus represent the power loss in friendly metal (specifically of the power receiver and power transmitter). The measured friendly metal power loss value may then be used to compensate the power loss measurements/calculations during the power transfer phase.

The system of FIG. 1 uses an approach for foreign object detection that seeks to provide improved foreign object detection. The approach may in many embodiments provide improved foreign object detection and specifically may in many embodiments provide a more accurate and/or reliable foreign object detection. The approach may further allow low complexity and low resource requirements. An advantage of the approach is that it may be suitable for inclusion in many existing systems, such as specifically in a Qi wireless power transfer system, and indeed that this may often be achieved with few modifications.

Figure 2:
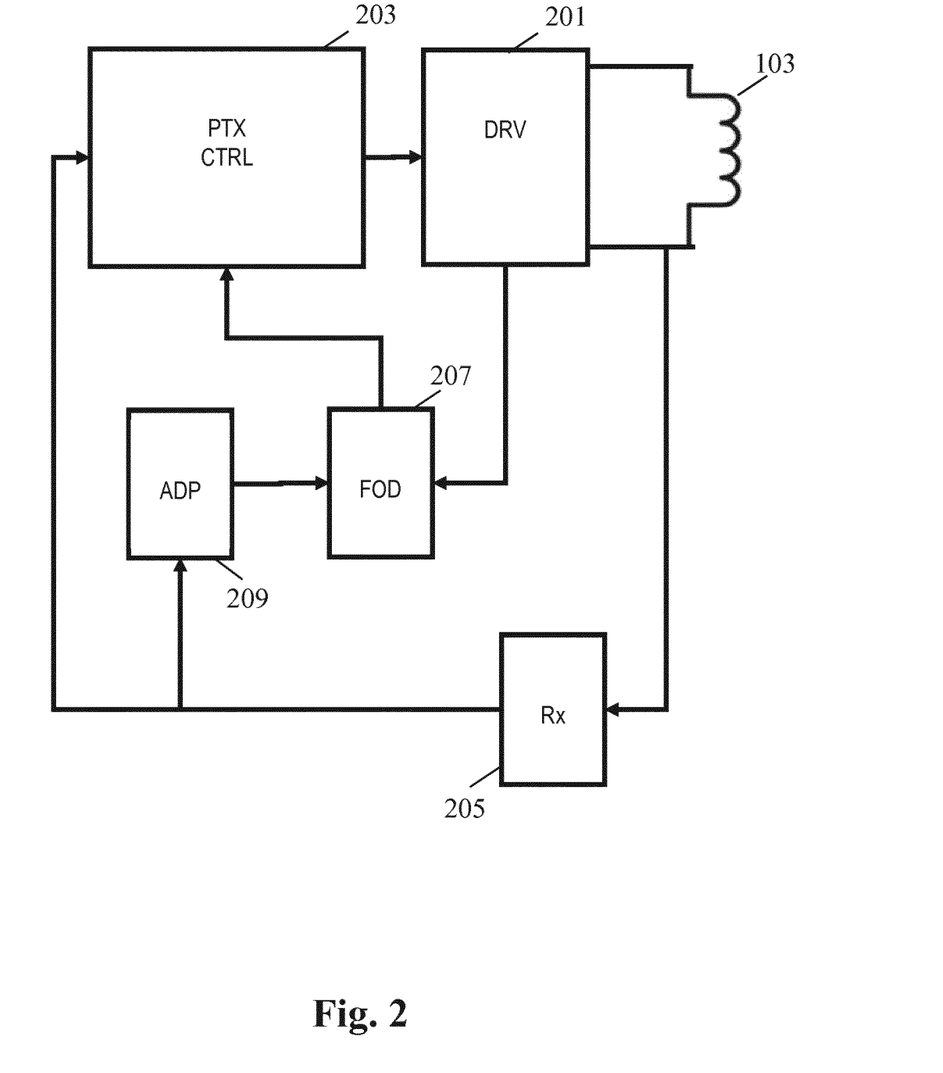
FIG. 2 illustrates an example of elements of a power transmitter for a power transfer system in accordance with some embodiments of the invention.
Figure 3:
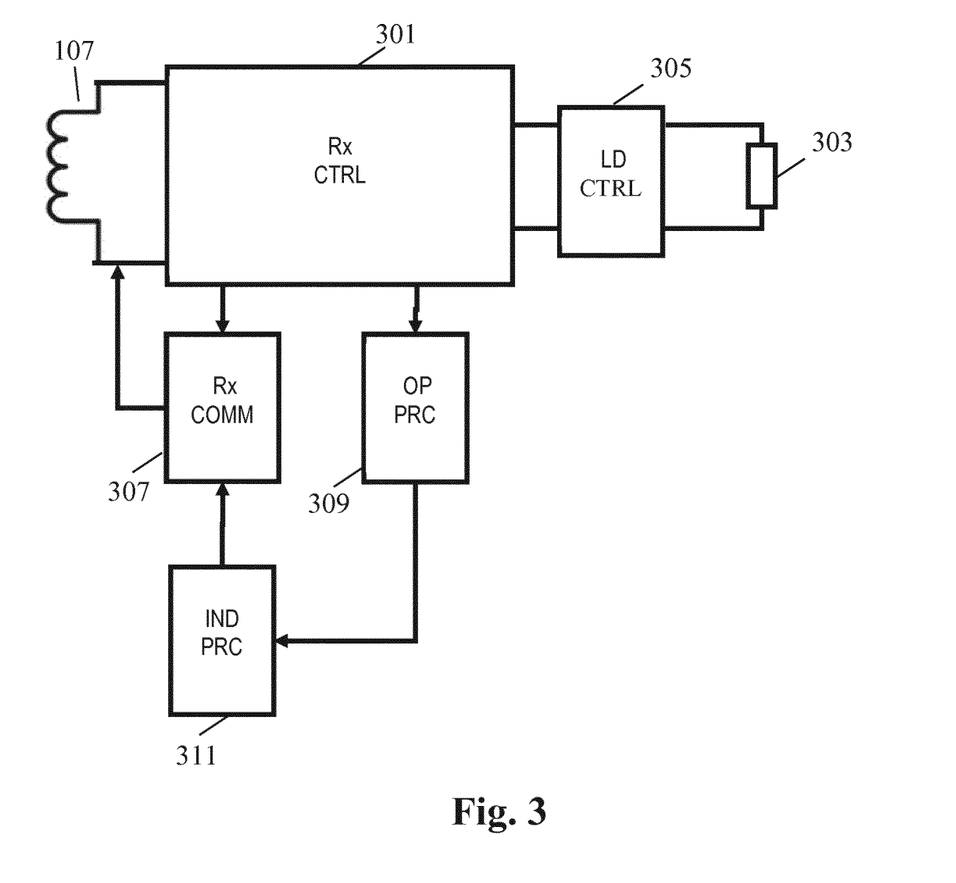
FIG. 3 illustrates an example of elements of a power receiver for a power transfer system in accordance with some embodiments of the invention.

FIG. 2 illustrates elements of the power transmitter 101 and FIG. 3 illustrates elements of the power receiver 105 of FIG. 1 in more detail.

The power transmitter 101 includes a driver 201 which can generate a drive signal that is fed to the transmitter coil 103 which in return generates the electromagnetic power transfer signal, which can provide a power transfer to the power receiver 105. The driver 201 may typically comprise an output circuit in the form of an inverter, typically formed by driving a full or half bridge as will be well known to the skilled person.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications.

The power transmitter controller 203 is in particular arranged to control the generation of the drive signal by the driver 201, and it can specifically control the power level of the drive signal, and accordingly the level of the generated power transfer signal. The power transmitter controller 203 comprises a power loop controller controlling a power level of the power transfer signal in response to the power control messages received from the power receiver 105 during the power control phase.

In order to receive data and messages from the power receiver 105, the power transmitter 101 comprises a power transmitter communicator 205 which is arranged to receive data and messages from the power receiver 105 (as will be appreciated by the skilled person, a data message may provide one or more bits of information). In the example, the power receiver 105 is arranged to load modulate the power transfer signal generated by the transmitter coil 103, and the power transmitter communicator 205 is arranged to sense variations in the voltage and/or current of the transmitter coil 103 and to demodulate the load modulation based on these. The skilled person will be aware of the principles of load modulation, as e.g. used in Qi wireless power transfer systems, and therefore these will not be described in further detail.

In some embodiments, communication may be performed using a separate communication channel which may be achieved using a separate communication coil, or indeed using the transmitter coil 103. For example, in some embodiments Near Field Communication may be implemented or a high frequency carrier (e.g. with a carrier frequency of 13.56 MHz) may be overlaid on the power transfer signal.

The power transmitter 101 further comprises a foreign object detector 207 which is arranged to perform foreign object detection tests, i.e. to specifically detect whether any undesired conductive elements are likely to be present within the generated electromagnetic field.

For example, the power level of (the power extracted from) the generated power transfer signal may be used to estimate the power being extracted by potential foreign objects. The power level of the drive signal fed to the transmitter coil 103 may be determined e.g. based on measurements of the current and voltage of the drive signal. The power receiver is arranged to provide messages reporting the power level of the power extracted from the power transfer signal by the power receiver, and the difference between the power level of the drive signal and the reported received power level may be determined. A calibration value determined during the calibrations and reflecting dissipation in friendly metal may be subtracted to provide a resulting unaccounted for power loss. If this exceeds a given threshold, the foreign object detector 207 may determine that a foreign object is present and otherwise it may determine that no foreign object is present.

It will be appreciated that many different foreign object detection algorithms are known and that these may be based on many different measurements and parameters. It will be appreciated that any suitable algorithm may be used.

The foreign object detection may specifically be based on a frequency property, phase property, voltage property, current property, power property, waveform property, timing property, and/or signal shape property of the drive signal.

For example, the frequency for which a given condition occurs (e.g. resonance of the output circuit or a given current or power level) can be detected and used to indicate whether a foreign object is present or not. Alternatively or additionally, the phase between current and voltage may be used to indicate the current loading of the power transfer signal and thus indicate whether a foreign object is present or not. As another example, the presence of a load may affect the waveform and result in e.g. this changing from approximating a square wave to approximating a sine wave. The foreign object detection may e.g. determine how closely the current or voltage of the drive signal correlates to a squarewave or sinewave signal and use this to detect a foreign object. For example, as described in US2009/0127936, it may determine a timing for when the drive signal crosses a threshold value and determine whether a foreign object is present in response to this timing.

In many embodiments, a current and/or voltage property of the drive signal may be used by the foreign object detection. For example, the quality factor or power loss can be determined from measurements of voltage and/or current properties of the drive signal as will be known to the person skilled in the art.

It will be appreciated that many other approaches are possible.

If a foreign object is detected, the power transmitter may for example proceed to terminate the power transfer or it may restrict the power level of the power transfer signal to be below certain maximum levels that are sufficiently low to ensure that no unacceptable heating of a foreign object occurs.

FIG. 3 illustrates some exemplary elements of the power receiver 105.

The receiver coil 107 is coupled to a power receiver controller 301 which couples the receiver coil 107 to a load 303 via a load controller 305. In the following, the term load will reflect the power consumed by the load and thus a higher load or loading will correspond to a higher load power level (and thus to a lower ohmic load).

The power receiver controller 301 includes a power path which converts the power extracted by the receiver coil 107 into a suitable supply for the load 303. In addition, the power receiver controller 301 may include various power receiver controller functionality required to perform power transfer, and in particular functions required to perform power transfer in accordance with the Qi specifications.

In order to support communication from the power receiver 105 to the power transmitter 101, the power receiver 105 comprises a power receiver communicator 307 which specifically may be a load modulator. The power receiver communicator 307 may specifically be arranged to vary the loading of the receiver coil 107 in response to data to be transmitted to the power transmitter 101. The load variations are then detected and demodulated by the power transmitter 101 as will be known to the person skilled in the art.

The power receiver communicator 307 may in some embodiments be a two way communicator e.g. being operable to detect amplitude, frequency, or phase modulation of the power transfer signal by the power transmitter. In some embodiments, communication may be performed using a separate communication channel which may be achieved using a separate communication coil. For example, in some embodiments Near Field Communication may be implemented or a high frequency carrier (e.g. with a carrier frequency of 13.56 MHz) may be overlaid on the power transfer signal.

The power receiver controller 301 may furthermore comprise functionality for supporting the foreign object detection operation. Specifically, it may during the power transfer phase determine estimates of the received power and report these back to the power transmitter 101 in accordance with the Qi specifications. The receiver power level may for example be determined based on measurements of the voltage and current of the induced signal in the receiver coil 107.

The power receiver controller 301 may also include functionality for supporting the calibration process during and upon entry of the power transfer phase. This may specifically be done by the power receiver controller 301 determining and reporting the received power level back to the power transmitter during the time intervals of these calibrations.

The Inventor has realized that although the approach of e.g. the Qi specifications may provide efficient and high performance power transfer and indeed foreign object detection, it may in some scenarios not be fully optimal. Specifically, the Inventor has realized that often the power transfer phase is initialized with a load that is substantially lower than the maximum or even the average, typical, or nominal load of the power receiver during power transfer. The power receiver and the load are often arranged to perform a gradual start-up process where a smaller load is initially connected and then only later increased to the full load power. However, as a consequence, the calibration process at initialization of the power transfer phase is performed for a load that may be substantially lower than the load experienced later. As a result, the compensation values determined by calibration relate only to substantially no load and a load that may be substantially lower than the actual load during most of the power transfer phase. This may require extrapolation of the compensation values to the current load. However, this may result in a relatively uncertain compensation value being applied which may increase the uncertainty of the foreign object detection.

Thus, an issue with the existing approach of Qi systems is that it typically uses only two data points for the compensation, namely at a very light (unconnected) load and a relatively low connected load, to determine the calibrated power curve. The resulting calibrated power curve is then likely to be less accurate because of the extrapolation involved at the higher power levels/loads. Accordingly, the accuracy of the calibrated power curve may be less than ideally desired.

The power transfer system of FIGS. 1-3 may address such issues and provide improved performance in many embodiments and scenarios. In the system, the power receiver 105 is further arranged to notify the power transmitter 101 of (at least some changes) in the operating point and specifically may notify the power transmitter 101 of substantial changes in the power extracted from the power transfer signal. The power receiver 105 may detect that a substantial change occurs in the load power and may notify the power transmitter 101 of this change. For example, if the power provided to the load is changed substantially during the power transfer phase, e.g. due to the power receiver/load switching to a different mode of operation, the power receiver 105 may transmit a message to the power transmitter 101 to indicate that such a power operating point change has occurred (or is about to occur).

The power transmitter 101 may receive the information and adapt the foreign object detection operation accordingly. For example, in response to an indication that the power receiver 105 has just changed the power operating point to a significantly higher target for the power being provided to the load 303, the power transmitter 101 may proceed to initialize a calibration which may then be performed for the new higher target load power. This may provide a more reliable foreign object detection at the higher power level as the foreign object detection does not have to rely on the calibration compensation value determined for a much lower power level.

As another example, the power transmitter 101 may additionally or alternatively change the foreign object detection criterion for typically a relatively short duration. This may prevent accidental false foreign object detections to occur as a result of transient conditions during the load change. It may for example prevent that the power transmitter 101 makes a foreign object detection decision due to measuring a significantly increased transmission power before the corresponding increased receive power level values have been reported from the power receiver 105. It may for example also temporarily suspend foreign object detection for the duration of a calibration operation.

The power receiver 105 may specifically comprise an operating point processor 309 which is arranged to determine a power operating point which reflects a (target) load power for the load 303.

The load power may be a target load power indicative of an intended load power on the power receiver, and thus of the power receiver on the power transfer signal. It may be a value which is constant for the current power operating point. Thus, the power operating point indication is an indication of the power that is to be delivered to the load by the power receiver. It represents the power provided to the load rather than the power extracted from the power transfer signal.

The power operating point indication may reflect a change in the power operating point during a power transfer phase, and specifically the power operating point may be provided continuously throughout the power transfer phase when the power operating point changes. The power operating point indications may accordingly be generated at any point during the power transfer phase when the power operating point changes.

In many embodiments, the power receiver may be arranged to operate in accordance with a set of load modes corresponding to different values of the load 303. In some embodiments, the load modes may simply be a low and high mode reflecting different load powers. In other embodiments, each load may be associated with a specific load power level (or range thereof).

The power receiver may in such embodiments be aware of when the load mode changes. For example, the power receiver may be arranged to start the power transfer phase at a low power mode. For example, if the load 303 is a battery being charged, the load controller 305 may initially restrict the current to a maximum level which is relatively low, i.e. a current limitation may be applied to keep the power to the load at a low level.

Following a successful start, the power receiver may switch to a high load power. This may be achieved by the current limiter of the load controller 305 switching to a higher maximum level or by completely switching off the current limiter to allow maximum charging current.

At some point, the battery forming the load may be close to fully charged and the power receiver may switch to a trickle charge. This may be achieved by the current limiter of the load controller 305 limiting the current to a suitable trickle charge level.

If the battery becomes discharged, e.g. by a large amount of power being extracted during a short time interval, the power receiver may again switch to the charging mode which high current and e.g. no current limitation.

For each of these mode changes, which may occur while the system is operating in the power control phase, the power receiver may transmit a power operating point indication to the power transmitter indicating that a change in the power operating point is occurring. The power operating point indication may simply indicate that a change is occurring or may in some embodiments provide information of the change, such as e.g. a difference in target power level for the load 303.

The power operating point indication may be indicative of a load change meeting a criterion, and specifically the power operating point indication may be indicative of a load change exceeding a threshold. For example, if the absolute change of the target power level of the power being provided to the load is more than a certain predetermined value, then the power receiver may generate a power operating point indication and transmit this to the power transmitter.

It will be appreciated that in the above example, the load controller 305 and load 303 is considered an inherent part of the power receiver. However, in many embodiments, the load 303 may e.g. be considered to be an external load. If the load controller 305 controlling the power provided to the load 303 is part of the power receiver, the operation of this can be used to determine when a change in power operating point occurs. Alternatively, if e.g. the power control functionality is external to the power receiver, the operating point processor 309 may e.g. determine the current power operating point by measuring the current and voltage of the signal provided to the load 303. In some embodiments, an external load may communicate with the power receiver to indicate that a change occurs in the power being extracted.

Thus, in some embodiments, the operating point processor 309 may be arranged to detect that the target load power has changed (or may change) by more than a given threshold. This may be an implicit detection. For example, if the power receiver and load may operate in different modes and it is known that the loading is sufficiently different in each of these modes, the operating point processor 309 may simply generate a power operating point indication indicating that the target load power has changed by more than a given amount in response to a detection that the mode changes. For example, when the load controller 305 changes the charging mode, it may communicate this to the operating point processor 309 which may proceed to generate a power operating point indication that reflects that a change in the power operating point has occurred.

In some embodiments, the power receiver controller 301 may measure a level of power which is provided to the load 303. For example, it may continuously monitor the current and voltage and from this calculate the effective power. The power receiver controller 301 may feed the determined power level values to the operating point processor 309 which may proceed to determine the current power operating point in response to the level of power. For example, the operating point processor 309 may have stored a set of operating points with associated power level ranges, and it may compare the current power level to these ranges to determine the current operating point. If the power level changes from being within a range of a first power operating point to being within the range of a second power operating point, the operating point processor 309 may proceed to cause a power operating point indication to be generated which indicates that the power operating point has been changed.

As another example, the operating point processor 309 may monitor the determined power level to detect any step changes in the power provided to the load 303. For example, if the power level changes by more than a given amount within a given time interval, then the operating point processor 309 may consider a change in the power operating point to have occurred and a new power operating point indication may be generated and transmitted to the power transmitter.

In many embodiments, the power operating point indication is accordingly generated in response to measurements of a power provided to the load 303.

The power operating point indication may in many embodiments be independent of a current power extraction by the power receiver. The power operating point indication is determined in response to the target load power and thus reflects the power that is (to be) provided to the load 303. The power that is extracted from the power transfer signal by the power receiver may depend on a number of other parameters including losses, the current operation of the power receiver, the exact configuration, the position of the power receiver on the power transmitter etc. Such parameters may for example be adjusted by power control messages that seek to dynamically control the flux density and electromagnetic field strength generated by the power transmitter to result in the desired induced current in the receiver coil 107. The power operating point indication in contrast may be generated to only be dependent on the power provided to the load 303 and to be independent of any other parameter of the power path, including properties of both the power path of the power receiver and the wireless power transfer.

The operating point processor 309 is coupled to an indication processor 311 which is arranged to generate a power operating point indication that is indicative of the power operating point. For example, in some embodiments, a power operating point indication may be generated as a single one bit flag that indicates that a change in the power operating point has occurred. As another example, the power operating point indication may be generated to directly describe the target load power such as by a value which directly describes the target load power as a number of watts. As yet another example, a power operating point indication may be described that identifies the (target) load power as one of a predetermined set of (target) load power values.

The indication processor 311 is coupled to the power receiver communicator 307 which is fed the power operating point indication and which transmits this to the power transmitter 101.

The power transmitter communicator 205 is arranged to receive the power operating point indication from the power receiver 105. The power transmitter communicator 205 is coupled to an adapter 209 which is fed the power operating point indication that represents the (target) load power for the load 303 of the power receiver 105.

The adapter 209 is further coupled to the foreign object detector 207 and is arranged to adapt the foreign object detection operation in response to the power operating point indication meeting a criterion.

The criterion may in many embodiments simply be that the power operating point indication has a specific value, or indeed even that a power operating point indication is received. For example, the power operating point indication may be a single bit indicating that the power receiver has changed the operating point, and in response to receiving this indication, the adapter 209 may proceed to control the foreign object detector 207 to e.g. perform a calibration and/or to suspend foreign object detection for a given duration.

In other embodiments, more complex criteria may be applied. For example, if the power operating point indication is indicative of a current step change in the target load power, the criterion may be that the step change should exceed a given threshold. As yet another example, the criterion may be that the load power should differ from a load power for which a previous calibration has been performed by more than a given threshold.

In many embodiments, the adapter 209 may be arranged to initiate a calibration process in response to receiving a power operating point indication that meets a given criterion. For example, in response to receiving a message comprising a power operating point indication that indicates that the power receiver has changed the operating point, the adapter 209 may be arranged to control the foreign object detector 207 to initialize a calibration process.

The performance of the calibration operation may the same as the one performed during the initialization of the power transfer operation and/or the process employed when first entering the power transfer phase. The calibration operation may specifically be done by measuring the transmitted power and subtracting a received power at the power receiver as indicated by a message from the power receiver. The difference is considered to be extraneous power loss in friendly metal. This compensation power loss may then be stored as a calibration parameter and applied in the foreign object detection at the current operating point.

Further, the new calibration point may be used together with the other calibration points to determine a calibration curve reflecting the estimated friendly metal power loss for different transmission powers. The new calibration point may thus provide an extra data point for determining a calibration curve. If the power receiver at some point switches to other operating points, the power transmitter may perform further calibrations thereby generating further data points for fitting a calibration curve. Thus, the approach may result in a more accurate calibration curve to be determined thereby providing improved foreign object detection across a range of different transmit power levels and operating points.

The approach is based on a consideration that if it is known that the power receiver changes the power operating point, it is highly likely that the change in power extracted from the power transfer signal is due to the change in the power operating point and not due to a foreign object being introduced at the same time. Since the foreign object detection performed at the previous operating point would detect the presence of a foreign object, it is thus highly likely that no foreign object is present immediately after a change in operating point and therefore a calibration process can be performed assuming that no foreign object is present. This will then provide an additional compensation value which can be used to perform a more accurate foreign object detection at the new power operating point.

The calibration may determine a calibration parameter that may be used to adapt the detection criterion for the foreign object detection. Typically, the calibration parameter may be a friendly power loss value estimating a power loss that is caused by a friendly metal in the power receiver and which is not included in the received power level indication from the power receiver. The friendly power loss may be subtracted from the difference between the determined transmit power and the indicated received power to provide an estimate of unknown/unaccounted for power loss. This unknown/unaccounted for power loss may then be compared to a predetermined power threshold and if it exceeds this threshold a foreign object is considered to be detected. Alternatively, the detection threshold may be adapted depending on the estimated friendly power loss such that the difference between the transmitted power and the received power is compared to a higher threshold that takes the friendly power loss into account.

In examples where the foreign object detection is based on measuring a quality factor for a resonance circuit including the transmitter coil 103, the calibration process may for example be used to estimate the quality factor of the output circuit for the new operating point, and the future foreign object detections may then be based on comparing measured quality factors to a threshold determined from the quality factor measured during the calibration process.

In some embodiments, the adapter 209 may be arranged to bias the foreign object detection operation towards no detection of a foreign object for a time interval in response to receiving an operating point indication indicating a change in the target load power which meets a criterion.

For example, if the power transmitter 101 receives a power operating point indication which indicates a step in the target load power for the load 303 exceeding a given predetermined value, the adapter 209 may proceed to control the foreign object detection to change the foreign object detection criterion for a predetermined duration, such as e.g. for 5 seconds or 10 seconds.

In some cases, the bias may be absolute in the sense that no positive foreign object detections are made within a given time interval. Thus, following the receipt of a power operating point indication indicating a change in the target load power, the foreign object detector 207 may ignore all positive detections for a given duration, or may simply be switched off. Thus, even if the foreign object detector 207 detects that the transmitted power level exceeds the received power level by more than an expected amount, or if the foreign object detector 207 measures a quality factor below a given expected threshold, this detection is not considered to be a detection of a foreign object.

Such an approach may specifically avoid or reduce the risk of false detections during transient conditions. It may be used to differentiate between situations wherein a sudden increase in the transmitted power is caused by a change in the operation of the power receiver and where it is caused by a foreign object entering the magnetic field.

In some embodiments, the bias may be more gradual and some foreign object detections are still possible. For example, the threshold for an estimated power difference between transmitted and received power may be increased during a short interval associated with the transition. This may substantially reduce the risk of false detections while at the same time still allowing some more extreme situations to be detected.

The approach may as an example allow the power transmitter to differentiate between a number of different scenarios that may occur. Indeed, when the power receiver changes the power operating point, the current through the power transmitter coil 103 and the amount of transmitted power typically changes. However, if the user moves the power receiver, or inserts a foreign object in the magnetic field, the power transmitter coil current and transmitted power also changes. If the power receiver informs the power transmitter about changes in the power operating point, the power transmitter can differentiate between these scenarios.

In the following, this may be illustrated by considering some specific scenarios. It is assumed that the system has made a transition from a first stable operating state to a second stable operating state (e.g. a load step or dump associated with a load impedance change). The following scenarios may for example occur:

Scenario 1:
The power transmitter coil current has increased.
The amount of transmitted power has increased.
The amount of received power remains the same.
The power receiver has not reported a change of its operating point.
It is likely that a foreign object has been inserted into the magnetic field.

Scenario 2:
The power transmitter coil current has decreased.
The amount of transmitted power has decreased.
The amount of received power remains the same.
The power receiver has not reported a change of its operating point.
It is likely that a foreign object has been removed from the magnetic field.

Scenario 3:
The power transmitter coil current has increased (or decreased).
The amount of transmitted power has increased (or decreased).
The amount of received power has increased (or decreased).
The power receiver has reported a change of operating point.
The new operating state is suitable for improving the calibration data, and thus a calibration process may be initiated.

Scenario 4:
The power transmitter coil current has increased or decreased.
The amount of transmitted power has not changed significantly.
The amount of received power has not changed. \
The power receiver has not reported a change of its operating point.
It is likely that the power receiver was moved to a different position (typically a position of worse or better coupling). It should be noted that it is assumed that the friendly metal losses in the power receiver remain approximately the same (if the change in the friendly metal loss is too high and cannot be determined, scenario 4 may be indistinguishable from scenario 1). The new operating state is suitable for improving the calibration data, and thus a calibration process may be initiated.

In many embodiments, the power operating point indication may be indicative of a future change in the (target) load power. Thus, the power operating point indication may in some embodiments reflect that a change is about to occur rather than that a change in the power operating point indication has occurred. The power operating point indication may in such a case thus not reflect the current or previous conditions but rather will reflect future conditions.

The power operating point indication may in such an embodiment e.g. be determined by a controller controlling the operation of the power receiver and/or the load 303. E.g. in the previous example of battery charging, the load controller 305 will know in advance that it is about to switch from e.g. a low charge current to a high charge current, or vice versa, and accordingly it may indicate this in advance to the operating point processor 309 resulting in a new power operating point indication being transmitted before the change occurs.

The power transmitter may accordingly adapt the foreign object detection operation in advance of the actual change in power operating point. For example, it may suspend the foreign object detection and/or initialize the calibration process in readiness for the change in power operating point actually occurring. Typically, the power operating point indication may be provided and transmitted shortly before the change in power operating point, and the power transmitter may simply suspend the foreign object detection/initialize the calibration immediately when receiving the power operating point indication and without any detailed timing of the operations being needed.

The approach of using future power operating point indications may result in a more efficient and reliable operation in many scenarios. It may for example reduce the risk of false detections during the transition between power operating points since the foreign object detection may be suspended before any changes in the transmitted power occurs.

The power operating point indication may be communicated from the power receiver to the power transmitter in any suitable form and in any suitable way. It may for example be communicated as a dedicated message which e.g. may be asynchronously transmitted in response to a detection by the power receiver that the target load power has changed or is about to change.

As mentioned previously, the power operating point indication may in many embodiments be a binary indication of whether a change in the power level meets a criterion. For example, if the power receiver determines that a change in the target load power has occurred or is about to occur, it may set a flag or transmit a single one bit message to indicate that there is a change in the power operating point. Thus, simply receiving a power operating point indication message may be an indication that the power operating point is changing. In response to the indication that the power operating point is changing, the power transmitter may as previously described e.g. suspend foreign object detection for a predetermined time interval and proceed to perform a calibration operation.

In many embodiments, it may be advantageous to transmit the power operating point indication as part of another message. This may in many cases be more efficient as the messaging overhead may be reduced. For example, the power operating point indication may be included as a field in an existing message, such as a field comprising a one bit flag indicating whether a power operating point is changing or not. In some cases, the power operating point indication may advantageously be provided as a specific value of a field of a message which may also be used to indicate other values or parameters. For example, during typical operation, a field may e.g. indicate a value, such as a received power level, but if the power receiver detects an upcoming change in the target load power, it may instead transmit a dedicated pattern indicating this upcoming change. If the power transmitter detects this pattern, it may proceed to suspend the foreign object detection (and thus the reported received power level would not be needed) and initiate a calibration process.

Thus, in many embodiments, the power operating point indication may be included in a received power level message which is used for reporting the power extracted from the power transfer signal by the power receiver.

As a specific example, for a Qi compatible system, the mode field of the received power data packet can be used to indicate that a change in power operating point has occurred or is about to occur. The message may currently have a mode setting of 1 when the pre-power transfer phase calibration phase is performed by the power receiver and a mode setting of 2 when the calibration upon entering the power transfer phase is performed. The mode field may in such embodiments be set e.g. to the value of 3 to indicate a change of the power operating point/target load power.

The power transmitter must confirm receipt of this data packet with an ACK response. If this ACK response is lost due to a communications error, the power receiver can repeat the received power data packet until it receives the ACK.

A specific example of a Qi compatible approach using such a protocol may be as follows:
1. The power transmitter uses a pre-power-transfer foreign object detection method to ensure that initially there is no foreign object present in the magnetic field.
2. The power transmitter and power receiver engage in the power transfer protocol up to and including the negotiation phase.
3. The power transmitter and power receiver execute the first stage of the calibration phase (light load, using mode=1 received power data packets).
4. The power transmitter and power receiver execute the second stage of the calibration phase (connected load, using mode=2 received power data packets) upon entering the power transfer phase.
5. The power transmitter and power receiver continue into the power transfer phase proper, and typically use mode=0 received power data packets—the power transmitter's response to these data packets informs the power receiver of potential issues with the ongoing power transfer.
6. Whenever the power receiver's power operating point changes beyond a predefined threshold, the power receiver uses a mode-3 received power data packet to inform the power transmitter that it should use the reported received power to update its calibration data, i.e. it should perform a new calibration process and store/use the determined calibration data.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:
1. A power transmitter comprising:
a transmitter coil, wherein the transmitter coil is configured to generate a power transfer signal;
a driver circuit, wherein the driver circuit is configured to generate a drive signal for the transmitter coil so as to generate the power transfer signal;
a foreign object detector,
wherein the foreign object detector is configured to perform a foreign object detection operation,
wherein the foreign object detection operation is configured to detect a presence of a foreign object in response to a property of the drive signal;
a communicator circuit,
wherein the communicator circuit is configured to receive a power operating point indication from a power receiver during a power transfer phase,
wherein the power operating point indication represents a load power for a load of the power receiver; and
an adapter circuit,
wherein the adapter circuit is configured to adapt the foreign object detection operation by calibrating a detection criterion for detecting the foreign object during the power transfer phase in response to the power operating point indication,
wherein the power operating point indication indicates a change in the load power meeting a power operating point criterion, and wherein the power operating point criterion comprises a change in the load power exceeding a threshold value.

2. The power transmitter of claim 1, wherein the power operating point indication is indicative of a future change in the load power.

3. The power transmitter of claim 1,
wherein the load power indicated by the power operating point indication is a target load power,
wherein the adapter circuit is configured to initiate a calibration process in response to the power operating point indication indicating the change in the target load power meeting the power operating point criterion, and
wherein the calibration process determines a calibration parameter for the foreign object detection operation in response to a measurement of the property of the drive signal.

4. The power transmitter of claim 1, wherein the load power indicated by the power operating point indication is a target load power,
wherein the adapter circuit is configured to bias the foreign object detection operation towards no detection of a foreign object for a time interval in response to the power operating point indication indicating the change in the target load power meets the power operating point criterion.

5. The power transmitter of claim 1,
wherein the load power indicated by the power operating point indication is a target load power,
wherein the adapter circuit is configured to adapt the foreign object detection operation to not detect a foreign object for a time interval in response to the power operating point indication indicating the change in the target load power meets the power operating point criterion.

6. The power transmitter of claim 1, wherein the power operating point indication is independent of a current power extraction by the power receiver.

7. The power transmitter of claim 1,
wherein the power operating point indication is included in a power level message,
wherein the power level message indicates a power extracted from the power transfer signal by the power receiver.

8. The power transmitter of claim 1,
wherein the load power indicated by the power operating point indication is a target load power,
wherein the power operating point indication is an indication of whether a change in the target power level meets the power operating point criterion.

9. The power transmitter of claim 1,
wherein the power operating point indication comprises a single one bit flag that indicates a change in the power operating point has occurred, and
wherein the adapter circuit is configured to perform a calibration of the foreign object detector in response to the power operating point indication.

10. The power transmitter of claim 1,
wherein the threshold value is a rate of change of power, and wherein the power operating point indication indicates that the power operating point criterion has been met when a measured rate of change in power level exceeds the threshold value.

11. A method of operation for a power transmitter, wherein the power transmitter is configured to provide power to a power receiver, the method comprising:

generating a drive signal for a transmitter coil such that the transmitter coil generates a power transfer signal;
executing a foreign object detection operation to detect a presence of a foreign object in response to a property of the drive signal;
receiving a power operating point indication from the power receiver during a power transfer phase, wherein the power operating point indication represents a load power for a load of the power receiver; and
adapting the foreign object detection operation by calibrating a detection criterion for detecting the foreign object during the power transfer phase in response to the power operating point indication,
wherein the power operating point indication indicates a change in the load power meeting a power operating point criterion,
wherein the power operating point criterion comprises a change in the load power exceeding a threshold value.

12. The method of claim 11, wherein the power operating point indication is indicative of a future change in the load power.

13. The method of claim 11, wherein the load power indicated by the power operating point indication is a target load power,
the method further comprising calibrating the transmitter in response to the power operating point indication indicating the change in the target load power meeting the power operating point criterion, wherein the calibrating comprises determining a calibration parameter for the foreign object detection operation in response to a measurement of the property of the drive signal.

14. The method of claim 11,
wherein the power operating point indication comprises a single one bit indication that indicates a change in the power operating point has occurred, and
wherein the adapter circuit is configured to perform a calibration of the foreign object detector in response to the power operating point indication.

15. The method of claim 11,
wherein the threshold value is a rate of change of power, and wherein the power operating point indication indicates that the power operating point criterion has been met when a measured rate of change in power level exceeds the threshold value.

16. A non-transitory computer readable medium having stored thereon instructions that when executed by processing circuitry of a wireless power transmitter cause the wireless power transmitter to:
generate a drive signal for a transmitter coil such that the transmitter coil generates a power transfer signal;
execute a foreign object detection operation to detect a presence of a foreign object in response to a property of the drive signal;
receive a power operating point indication from the power receiver during a power transfer phase, wherein the power operating point indication represents a load power for a load of the power receiver; and
adapt the foreign object detection operation by calibrating a detection criterion for detecting the foreign object during the power transfer phase in response to the power operating point indication,
wherein the power operating point indication indicates a change in the load power meeting a power operating point criterion, and
wherein the power operating point criterion comprises a change in the load power exceeding a threshold value.

17. The non-transitory computer readable medium of claim 16, wherein the power operating point indication is indicative of a future change in the load power.

18. The non-transitory computer readable medium of claim 16, wherein the load power indicated by the power operating point indication is a target load power, the instructions further comprising instructions that, when executed by the processing circuitry, cause the wireless power transmitter to determine a calibration parameter for the foreign object detection operation in response to a measurement of the property of the drive signal.

19. The non-transitory computer readable medium of claim 16,
   wherein the power operating point indication comprises a single one bit flag that indicates a change in the power operating point has occurred, and
   wherein instructions, when executed by the processing circuitry, cause the wireless power transmitter to perform a calibration of a foreign object detector in response to the power operating point indication.

20. The non-transitory computer readable medium of claim 16,
   wherein the power operating point indication indicates that that the power operating point criterion has been met when a charging mode of the receiver has changed.

* * * * *